3,231,526
PEAT AS A FILLER FOR AQUEOUS PHENOLIC
ADHESIVE COMPOSITIONS
George S. Wilson, Baie d'Urfe, Quebec, Canada, assignor to Monsanto Canada Limited, La Salle, Montreal, Quebec, Canada, a corporation of Canada
No Drawing. Filed June 29, 1964, Ser. No. 378,970
4 Claims. (Cl. 260—17.2)

This invention is a continuation-in-part of that claimed in copending application S.N. 79,119, filed December 29, 1960, and now abandoned, and relates to novel aqueous adhesive compositions. More particularly, it relates to a novel filler for use in aqueous alkaline phenol-formaldehyde resin adhesive compositions.

One important function of the filler in an aqueous adhesive composition is to improve the working properties of the active ingredient, including the provision of requisite flow characteristics. Various types of cellulosic and inorganic fillers have long been so employed, frequently in combination. One problem associated with the use of cellulosic fillers is the need for a digestion step to develop their best working properties, either prior to use or in situ during the adhesive preparation.

Another problem associated with the use of these cellulosic fillers has become of major importance with the recent emphasis placed upon fast curing phenolic adhesives. For example, in the manufacture of plywood at least a portion of the filler used must be one of relatively high water absorbency to retain the aqueous solution of resin solids at the glue-line (where the adhesive composition competes with the highly absorptive dry wood for the available water) for at least a reasonable length of time to permit the assembly of the wood members into a laminate.

The use of conventional cellulosic fillers of high water absorbency has required either (1) a sacrifice of much of the desired speed of cure in order to maintain suitable flow and handling characteristics under adverse mill conditions, or (2) the development of improved mill techniques to reduce the handling time of wood laminates in order that full advantage can be taken of rapid cure. However, mill conditions which result in long assembly times or other conditions causing the same or related problems cannot always be avoided. Such other conditions include the use of hot veneers, the use of relatively light glue-spreads, and extended press loading cycles. Extended assembly times and press loading cycles are commonly employed in the lamination of hard-wood veneers. Under such mill conditions, the flow characteristics of the currently available fast-curing adhesives are adversely affected almost to the point of elimination of flow and the quality of the plywood bond and/or the production rate thereof suffers accordingly. What is required is a filler of relatively high water absorbency which will retain suitable flow characteristics for extended periods of time in conjunction with even the most reactive of adhesive resins by absorbing the liquid phase of the adhesive system and maintaining it intact on the glue-line.

It is an object of this invention to provide novel aqueous adhesive compositions.

Another object is the provision of novel filler materials of relatively high water absorbency for use in aqueous adhesive compositions.

Another object is the provision of aqueous adhesive compositions which maintain suitable flow characteristics under adverse mill conditions such as long assembly time, hot or warm veneers, inadvertent use of low glue-spreads, etc.

Another object is the provision of fast-curing phenolic adhesives which maintain suitable flow characteristics under mill conditions, as above, without a corresponding loss of, or interference with, resin reactivity.

These and other objects are attained by combining a phenol-formaldehyde resin as hereinafter defined, with particulate peat in an aqueous media. Other conventional fillers and modifiers may also be present.

The following examples are given in illustration of the invention and are not intended as limitations thereon. Where parts are mentioned they are parts by weight.

The following four examples illustrate typical mixing procedures which may be used in the formulation of the novel aqueous adhesive compositions of this invention.

*Example I*

Cold-mix procedure.—A pilot-plant glue mixer is charged with 60 parts of an aqueous phenol-formaldehyde resin having a MacMichael #26d viscosity of about 50 at 70° F. The aqueous phenol-formaldehyde resin employed is prepared by the condensation reaction of 1.0 molar proportion of phenol with 2.25 molar proportions of formaldehyde in the presence of 0.65 molar proportion of sodium hydroxide, the latter being added in three portions of 0.3, 0.25 and 0.1 molar proportions, respectively. The P.M.M.A. solids of the resin is about 40%. Five parts of sphagnum moss peat (thru 100 mesh) having a moisture content of about 18% on a wet weight basis are added and the batch is intimately mixed. Finally, 5.5 parts of clay and 25 parts of water are charged and mixing is conitnued for another 5 minutes. The adhesive composition obtained has a MacMichael #26d viscosity of about 108 at 70° F.

*Example II*

Cold-digestion procedure.—The glue mixer of Example I is charged with 21.5 parts of water, 4 parts of a 50% aqueous sodium hydroxide solution, 5 parts of clay and 5 parts of ground sphagnum moss peat (thru 10 mesh) having a moisture content of about 7% on a wet weight basis. The batch is digested for about 30 minutes at room temperature and then 60 parts of the aqueous phenol-formaldehyde resin employed in Example I are slowly added, with mixing, over a period of about 5 minutes. The adhesive composition obtained has a MacMichael #26d viscosity of about 147 at 70° F.

*Example III*

Hot-digestion procedure.—Example II is repeated except that the initial charge is digested for about 30 minutes at a temperature of about 180° F., then cooled to about 80° F., at which temperature the aqueous phenol-formaldehyde resin is added. The adhesive composition obtained has a MacMichael #26d viscosity of about 115 at 70° F.

*Example IV*

Hot-mix procedure.—The glue mixer of Example I is charged with 22 parts of water and 6.3 parts of agricultural grade sphagnum moss peat having a moisture content of about 35% on a wet weight basis. This peat is not ground but is merely coarse screened (about 32 mesh) prior to use to remove foreign materials. The mixture is digested for about 10 minutes at a temperature of 180° F. Maintaining said 180° F. temperature throughout, 7.6 parts of clay are added, followed by another 10 minutes of mixing, and then 60 parts of the aqueous phenol-formaldehyde resin of Example I are added. Finally, after another 10 minutes of mixing, the batch is cooled to about room temperature. The adhesive composition obtained has a MacMichael #26d viscosity of about 170 at 70° F.

The principal significant evaluation tests which indicate the utility of plywood construction units are shear tests devised to determine the relative strength of the glue bond to the wood species being bonded. The shear tests are run under various condition, as for example, dry, wet, and boil tests and are reported as the shear stress necessary to break the test specimen along, or near, the glue-line in pounds per square inch and the percent of wood failure present at the ruptured bond. Thus, the figure 100–95 signifies that a shear stress of 100 p.s.i. is necessary to rupture the specimen and that the wood failure is 95%. The following example describes the fabrication of test plywood panels and their evaluation. Following the example is a table summarizing the relative bond strengths obtained using the several adhesive formulations described in Examples I, II, III, and IV.

*Example V*

Five-ply 11/16" Douglas fir plywood panels are prepared using 55 pounds of adhesive per thousand square feed of double glue-line (M DGL) at assembly times of 10 and 40 minutes respectively, hot pressing the panels at 200 p.s.i. and 285° F. for 6.5 minutes. Individual panels are prepared using each of the adhesive formulations of Examples I–IV. Each panel is cut into 6 test specimens which are then tested (1) for dry-shear strength, (2) for wet-shear strength and (3) for boil-shear strength, measuring both the breaking load and percent wood failure. The dry-shear tests are run on duplicate 1" x 3" shear samples which are scored just through the glue-line under test from opposite sides, the two cuts being placed so as to apply the subsequently applied stress to a one-square-inch area. The samples are stressed to destruction on the Hydraulic Plywood Testing Machine #HC–455, manufactured by I. F. Laucks, Inc. and examined for the percent of wood failure. The wet-shear tests are run similarly, but the shear samples are soaked in water at room temperature for 48 hours prior to testing and are tested in the wet condition. The boil-shear tests are also run similarly, but the shear samples are pre-tested by alternately boiling in water for 4 hours, air drying at 145° F. for 20 hours, and again boiling in water for 4 hours. These shear samples are also tested in the wet condition. The average results are summarized below.

| Adhesive | Assembly time (minutes) | Shear results | | |
|---|---|---|---|---|
| | | Dry | Wet | Boil |
| Example I | 10 | 123–98 | 126–90 | 95–94 |
| | 40 | 138–99 | 125–87 | 105–93 |
| Example II | 10 | 127–96 | 117–91 | 99–84 |
| | 40 | 127–98 | 109–91 | 104–95 |
| Example III | 10 | 128–99 | 129–89 | 101–93 |
| | 40 | 133–97 | 142–93 | 110–95 |

These tests indicate that the peat-filled adhesive formulations provide excellently bonded panels of exterior-grade plywood.

The following two examples illustrate the use of peat to increase the tolerance of phenol-formaldehydes resin adhesives to long assembly times.

*Example VI*

A pilot-plant glue mixer is charged with 15 parts of water and 100 parts of an ammoniated phenol-formaldehyde resin having a MacMichael #26d viscosity of about 30 at 70° F. The resin employed is prepared by the condensation reaction of 1 molar proportion of phenol with 2.25 molar proportions of formaldehyde in the presence of 0.35 molar proportion of sodium hydroxide, the latter being added in two portions of 0.15 and 0.20 molar proportions, respectively. The condensation is finished in the presence of ammonium hydroxide to destroy residual formaldehyde. After mixing the water and resin until homogeneous, 3 parts of clay and 7 parts of sphagnum moss peat (thru 100 mesh) having a moisture content of about 18% on a wet weight basis are added and mixing is continued until the batch is again homogeneous. The adhesive composition obtained has a MacMichael #26d viscosity of about 134 at 70° F.

*Example VII*

A series of five-ply ⅝" Douglas fir plywood panels are prepared using 55 pounds of the adhesive of Example VI per thousand feet of double glue-line (M DGL) at assembly times of 5 minutes and 1, 4, 8, 16, 24 and 48 hours respectively. Each panel is hot pressed at 200 p.s.i. and 285° F. for 8 minutes and subsequently evaluated by the boil-shear strength test method described in Example V. The percentage wood failure under tensile stress is also determined by wedging a knife blade between adjacent plies of the test panels and prying the plies apart.

| Assembly time | Wood failure (Knife), percent | Wood failure (shear after boiling), percent |
|---|---|---|
| 5 minutes | 70 | 74 |
| 1 hour | 90 | 97 |
| 4 hours | 95 | 96 |
| 8 hours | 95 | 94 |
| 16 hours | 95 | 83 |
| 24 hours | 95 | 90 |
| 48 hours | 90 | 83 |

Peat is partially decomposed, disintegrated and acid hydrolyzed vegetable matter. Principal among the peat-forming plants are the mosses such as sphagnum and hypnum, marsh and heath plants, grasses, sedges, water plants, algae, etc. In a preferred embodiment, the moss peats such as sphagnum moss peat and hypnum moss peat are employed because of their ready commercial availability.

Freshly mined peat generally contains about 90% moisture. After conventional processing, commercial peat contains about 20 to 45% moisture, on a wet weight basis. Such commercially available peat may be employed or it may be further dried prior to use. However, at below about 10% moisture content, on a wet weight basis, the wettability of the peat becomes adversely affected. Such dry peats are most advantageously employed in alkaline adhesive compositions. The peat should be at least coarse screened (about 10 mesh) prior to use to remove foreign materials such as sticks, roots, bark fragments, etc. Although the peat may advantageously be alkali-digested, either prior to use or in situ during the formulation of the adhesive composition, such is not necessary. However, when the peat is not to be digested, for example, when it is simply to be mixed, hot or cold, into a low alkaline aqueous phenolic adhesive composition which is used before any digestion can occur, the peat should be reduced in particle size to about 100 mesh or less, for example, 325 mesh. Actually, there is no lower limit on particle size as far as operability of these adhesive compositions is concerned. It may become necessary, from the standpoint of maximum efficiency of the size reduction process, to first dry the peat to a moisture content where desired grinding efficiency is obtained. Conventional techniques for size reduction may be employed.

Peat has been found to be a satisfactory material wherever fillers of relatively high water absorbency are desired or required, such as aqueous adhesive compositions. It has been found that peat may be used as filler, either alone or in conjunction with auxiliary fillers of either high or low water requirement, in alkaline phenol-formaldehyde resin adhesive compositions.

The phenol-formaldehyde resins employed are prepared by condensing 1 molar proportion of a phenol with from 1.75 to 3.5 molar proportions of formaldehyde in the presence of from 0.15 to 2.5 molar proportions of an alkali metal hydroxide. The condensation is carried out in a plurality of steps accompanied by incremental addition of the alkali metal hydroxide. Two or more increments may be used. Such resins and the methods by which they may be prepared are more fully described in U.S. Patents 2,360,376, 2,437,988, and Re. 23,347 and in copending application S.N. 35,442, filed June 13, 1960 and now abandoned. U.S. application 306,991, filed September 6, 1963 (Canada Patent No. 680,094), describes particularly suitable phenolic resins prepared by continuously charging the alkali metal hydroxide during at least the bodying stage of the resin preparation.

The final aqueous alkaline phenol-formaldehyde resin adhesive compositions of this invention should contain from about 5 to 70% phenol-formaldehyde resin solids based upon the combined weight of water and said phenol-formaldehyde resin solids.

From 10 to 110 parts by weight of filler, on a dry basis, per 100 parts by weight of phenol-formaldehyde resin solids are employed. The filler may be entirely peat or it may be a combination, in any proportion, of peat and other conventional fillers of either high or low water requirement. In a preferred embodiment, from 25 to 70% of the total filler requirement is peat, the remainder (i.e., from 30 to 75% of the total filler requirement) being an auxiliary filler of relatively low water requirement. Through careful selection of the auxiliary filler and the relative proportion of peat to such auxiliary filler, the aqueous adhesive compositions of this invention may be tailored to suit any desired application or to specific mill conditions. Examples of suitable auxiliary fillers of low water requirement include, for example, low or non-silica, finely ground, inert materials such as clay, talc, whiting, calcite, tricalcium phosphate, various coals including lignite, bituminous and anthracite, etc., cellulosic materials such as certain fractions of bark flour, nut shell flours such as walnut shell fluor, the endocarps of drupes such as apricot, peach and prune, etc. Examples of suitable auxiliary fillers of high water requirement include, for example, Furafil, ground corn cobs, wood flour, etc.

The aqueous adhesive compositions of this invention may be formulated either hot or cold. Cold mixing is generally effected at a temperature of from about 50 to 100° F. and hot-mixing at from about 160 to 210° F. However, any temperature between the freezing and boiling points of water may be employed. The several components may be combined in any sequence, the only limiting factor being the practical consideration of maintaining efficiency of the mixing process and homogeneity of the product.

If desired, the peat may be digested before combination with the phenol-formaldehyde resin for from about 10 to 30 minutes in the presence of from about 10 to 45 parts by weight of an alkaline digesting agent per 100 parts of peat, on a dry weight basis. Alternatively, the peat may be digested in the presence of the resin and/or protein where lesser degrees of digestion are acceptable. In many instances the alkalinity associated with the alkaline phenol-formaldehyde resins will suffice to provide an acceptable degree of digestion. The digestion may be effected either hot or cold. The preferred alkaline digesting agents are the alkali metal hydroxides, i.e., sodium hydroxide, lithium hydroxide, potassium hydroxide, rubidium hydroxide, cesium hydroxide, or a mixture thereof. Other suitable alkaline digesting agents include alkali metal carbonates such as sodium carbonate, etc. and other basic salts which in a 0.1 N aqueous solution have a pH greater than about 9.5. In this embodiment, the phenol-formaldehyde resin and the remaining components are added in any sequence after the requisite period for adequate digestion has elapsed, when the pre-digestion alternative is used. Temperatures as discussed in the previous paragraph may be employed.

The quantity of water employed is limited to that amount wherein the final aqueous adhesive composition will (1) be possessed of suitable spreading characteristics when used with conventional glue spreaders and (2) contain the proper concentration of phenol-formaldehyde resin for the end use intended. Thus, the final viscosity may range from about 50 to 1000 MacMichael #26d units at 70° F. The quantity of water added during the mixing procedure should be determined giving due consideration to the water present in the wet filler and in the aqueous resin and/or protein employed, as well as to the viscosity of said aqueous resin and/or protein.

The novel aqueous adhesive compositions of this invention can be further modified with conventional additives such as amylaceous materials, hardening agents, epoxides, antifoam agents, buffer salts, dyes, etc. to provide special adhesive compositions adapted to particular applications. Similarly, materials such as carboxymethyl cellulose, hydroxyethyl cellulose, polyelectrolytes, polyolefins, polyesters, etc., may also be added for further control of spreadability, viscosity, and assembly time tolerance.

The aqueous adhesive compositions of this invention have been shown in the examples to be excellently suited for use in laminating lumber or wood veneers to form plywood, in end or edge gluing veneers, etc. In addition, they may also be used as adhesives for paper, cardboard, cloth, plastics, etc., bonding such materials to themselves, to each other, or to wood. They may be applied either directly as liquids, or indirectly on a wet or dry self-supporting film.

It is obvious that many variations may be made in the products and processes set forth above without departing from the spirit and scope of this invention.

What is claimed is:

1. An aqueous adhesive composition having a viscosity of from about 50 to 1000 MacMichael #26d units at 70° F. and comprising a phenol-formaldehyde resin in intimate combination with a filler comprised at least partially of alkali digested peat in a proportion of from about 10 to 110 parts by weight of filler per 100 parts of said phenol-formaldehyde resin solids and sufficient water to provide said viscosity together with a phenol-formaldehyde resin solids content of from about 5 to 70% by weight based upon the total weight of the aqueous adhesive composition; said alkali digested peat having been obtained by digesting 100 parts of particulate peat with from about 10 to 45 parts of an alkaline water-soluble digesting agent taken from the group consisting of alkali metal salts whose 0.1 N aqueous solutions have a pH of greater than 9.5, alkali metal hydroxides and mixtures thereof; said phenol-formaldehyde resin comprising the reaction product of 1 molar proportion of phenol with from 1.75 to 3.5 molar proportions of formaldehyde and from 0.15 to 2.5 molar proportions of an alkali metal hydroxide, the alkali metal hydroxide being charged in at least 2 increments.

2. An aqeuous adhesive composition as in claim 1 wherein from 25 to 70% by weight of the filler is alkali digested peat and the remainder is a filler of low water requirement.

3. A process for preparing an aqueous adhesive composition having a viscosity of from about 50 to 1000 Mac-Michael #26d units at 70° F. which comprises (a) contacting from about 10 to 110 parts of particulate peat in an aqueous media with from about 10 to 45 parts of an alkaline water-soluble digesting agent per 100 parts of peat, on a dry weight basis, for from about 10 to 30 minutes, and (b) subsequently combining therewith 100 parts of a phenol-formaldehyde resin and sufficient water to provide said viscosity together with a phenol-formaldehyde resin solids content of from about 5 to 70% by weight based upon the total weight of the aqueous adhesive composition; said alkaline water-soluble digesting agent being selected from the group consisting of alkali metal salts whose 0.1 N aqeuous solutions have a pH of greater than 9.5, alkali metal hydroxides and mixtures thereof, said phenol-formaldehyde resin comprising the reaction product of 1 molar proportion of phenol with from 1.75 to 3.5 molar proportions of formaldehyde and 0.15 to 2.5 molar proportions of an alkali metal hydroxide, the alkali metal hydroxide being charged in at least 2 increments.

4. A process as in claim 3 wherein from 25 to 70% by weight of the filler is alkali digested peat and the remainder is a filler of low water requirement.

References Cited by the Examiner

UNITED STATES PATENTS

| 1,847,690 | 5/1932 | Mellanoff | 117—161 |
| 2,430,736 | 11/1947 | Redfern | 260—7 |
| 2,698,307 | 12/1954 | Heritage | 260—29.3 |

FOREIGN PATENTS 344,086  3/1931  Great Britain.

MURRAY TILLMAN, *Primary Examiner.*